(12) United States Patent
Luis Alconero et al.

(10) Patent No.: US 12,486,175 B2
(45) Date of Patent: Dec. 2, 2025

(54) CONTINUOUS PROCESS AND SYSTEM FOR THE PRODUCTION OF SODIUM BICARBONATE CRYSTALS

(71) Applicant: UNIVERSITÉ CATHOLIQUE DE LOUVAIN, Louvain-la-Neuve (BE)

(72) Inventors: Patricia Luis Alconero, Bierbeek (BE); Vida Sang Sefidi, Louvain-la-Neuve (BE); Mar Garcia Alvarez, Louvain la Neuve (BE); Marie-Charlotte Sparenberg, Louvain-la-Neuve (BE)

(73) Assignee: UNIVERSITÉ CATHOLIQUE DE LOUVAIN, Louvain-la-Neuve (BE)

( * ) Notice: Subject to any disclaimer, the term of this patent is extended or adjusted under 35 U.S.C. 154(b) by 175 days.

(21) Appl. No.: 18/255,448

(22) PCT Filed: Dec. 3, 2021

(86) PCT No.: PCT/EP2021/084134
§ 371 (c)(1),
(2) Date: Jun. 1, 2023

(87) PCT Pub. No.: WO2022/117800
PCT Pub. Date: Jun. 9, 2022

(65) Prior Publication Data
US 2024/0002246 A1    Jan. 4, 2024

(30) Foreign Application Priority Data
Dec. 3, 2020  (EP) .................... 20211693

(51) Int. Cl.
*C30B 7/04* (2006.01)
*B01D 61/24* (2006.01)
*C01D 7/10* (2006.01)

(52) U.S. Cl.
CPC ........... *C01D 7/10* (2013.01); *B01D 61/2461* (2022.08); *C30B 7/04* (2013.01)

(58) Field of Classification Search
CPC .......... C30B 7/04; C01D 7/10; B01D 61/2461
See application file for complete search history.

(56) References Cited

U.S. PATENT DOCUMENTS 5,281,254 A * 1/1994 Birbara ............. B01D 53/1493
96/5
6,312,655 B1 * 11/2001 Hesse ..................... C23F 11/06
423/232

(Continued)

FOREIGN PATENT DOCUMENTS

CN    103172090 A    6/2013
CN    106946656 A    7/2017

(Continued)

OTHER PUBLICATIONS

International Search Report issued on Mar. 10, 2022, in corresponding International Patent Application No. PCT/EP2021/084134, 4 pages.

(Continued)

*Primary Examiner* — Robert M Kunemund
(74) *Attorney, Agent, or Firm* — Maier & Maier, PLLC

(57) ABSTRACT

A continuous process for the production of sodium bicarbonate crystals from the carbon dioxide of a gas stream including an absorption step of the carbon dioxide from a gas stream into an aqueous solution including a sodium carbonate salt to produce an aqueous solution of sodium bicarbonate, then a crystallization step of the sodium bicarbonate salt obtained at the first step. A system for the production of sodium bicarbonate crystals from carbon dioxide of a gas stream including a control unit, an absorption unit and a crystallization unit.

20 Claims, 2 Drawing Sheets

(56) References Cited

U.S. PATENT DOCUMENTS

| | | | |
|---|---|---|---|
| 7,507,388 B2 | 3/2009 | Ceylan et al. | |
| 8,865,096 B2* | 10/2014 | Breton | C01D 7/22 |
| | | | 23/302 T |
| 9,382,125 B2 | 7/2016 | Kisielewski et al. | |
| 9,868,644 B2* | 1/2018 | Piet | C01D 7/32 |
| 10,208,363 B2* | 2/2019 | Vandendoren | C01D 7/126 |
| 2008/0193365 A1* | 8/2008 | Coustry | C01D 7/07 |
| | | | 423/421 |
| 2009/0260993 A1* | 10/2009 | Coustry | C25B 1/34 |
| | | | 205/551 |
| 2009/0291038 A1 | 11/2009 | Davoine et al. | |
| 2012/0153223 A1 | 6/2012 | Jeong et al. | |
| 2013/0156662 A1 | 6/2013 | Sa | |
| 2020/0002183 A1 | 1/2020 | Chacartegui et al. | |

FOREIGN PATENT DOCUMENTS

| | | |
|---|---|---|
| EP | 2987525 A1 | 2/2016 |
| JP | H10500612 A | 1/1998 |
| JP | 2014528886 A | 10/2014 |
| WO | 9804339 A1 | 2/1998 |
| WO | 2009051583 A1 | 4/2009 |
| WO | 2010014774 A2 | 2/2010 |
| WO | 2011014955 A1 | 2/2011 |
| WO | 2013106294 A1 | 7/2013 |
| WO | 2014007032 A1 | 1/2014 |

OTHER PUBLICATIONS

Bao L et al, "Facilitated transport of $CO_2$ across a liquid membrane: Comparing enzyme, amine, and alkaline", Sep. 1, 2006, vol. 280, No. 1-2, p. 330-334, XP024931969, 5 pages.

Office Action issued on Apr. 16, 2025, in corresponding Chinese Application No. 202180081572.5, 22 pages.

Office Action issued on Sep. 22, 2025, in corresponding Japanese Application No. 2023-533857, 6 pages.

* cited by examiner

CONTINUOUS PROCESS AND SYSTEM FOR THE PRODUCTION OF SODIUM BICARBONATE CRYSTALS

FIELD

The present invention relates to a continuous process for the production of sodium bicarbonate crystals from the carbon dioxide of a gas stream.

The invention also relates to a system for the continuous production of sodium bicarbonate crystals from carbon dioxide of a gas stream.

BACKGROUND

Global warming is a major concern. The alarming increase of atmospheric $CO_2$ levels is fostering the research community and the industry to look for solutions to stop the steady increase of global temperatures and their drastic consequences. Government authorities and international conferences aim at reducing greenhouse gas emissions and encourage the development of sustainable processes using renewable sources. In order to reduce emissions from the industrial sector, carbon dioxide capture and reuse as a raw material in the production of marketable products may become not only economically feasible but also a profitable business.

Among many possible chemical products manufactured from $CO_2$, sodium bicarbonate ($NaHCO_3$) is of particular interest as it is an inorganic salt that can be used for numerous applications in the chemical, food, textile and pharmaceutical industries and, depending the production process, has a carbon mitigation potential that contributes to the softening of the greenhouse effect.

Regarding the production of sodium bicarbonate from $CO_2$ reuse, four main steps are necessary: $CO_2$ purification, sodium carbonate dissolution, reaction of carbonation and separation of the sodium bicarbonate.

Sodium bicarbonate is a white powdered salt which is characterized as being a water-soluble chemical. Initially, the sodium bicarbonate production at industrial scale started in 1846. Later, in 1860, the Belgium industrial chemist Ernest Solvay developed an improved industrial method for production of sodium carbonate and bicarbonate.

Due to the high demand for sodium bicarbonate, studies have been carried out with the purpose of proposing sodium bicarbonate production routes that present higher conversions, flexibility of raw materials and also economically viable, contributing to the $CO_2$ mitigation.

To date, two main routes have been developed, namely the Solvay process and soda ash carbonation from trona. Among the main raw materials used in the production process of sodium bicarbonate, sodium chloride is presented as most economically feasible while sodium carbonate is indicated as the most environmentally viable alternative.

Traditionally, the world production of sodium bicarbonate was mostly done by the Solvay process using $CO_2$, $NH_3$ and NaCl as main reactants. However, the presence of ammonia, which is considered as an environmental and health hazard compound, remains one of the major drawbacks of the Solvay process and companies in the field turn to the soda ash carbonation process from trona to produce sodium bicarbonate in large scale.

Natural mineral trona ($Na_2CO_3$—$NaHCO_3$-$2H_2O$) is extracted from nature. Trona is stable up to 57° C., creates intermediate compounds such as wegsheiderite ($Na_2CO_3$-$3NaHCO_3$) and sodium monohydrate ($Na_2CO_3$—$H_2O$) between 57° C. and 160° C. and decomposes to sodium carbonate above 160° C.

We know for example U.S. Pat. No. 9,382,125 that describes a process for the joint production of crystalline sodium bicarbonate in which $CO_2$ is generated as an intermediate product at least a portion of which is used as a feed to the sodium bicarbonate production step from sodium carbonate.

We also know patent application WO 2013/106294 that describes a carbonation process for the production of sodium bicarbonate from trona. U.S. Pat. No. 7,507,388 describes a process for the production of bicarbonate from trona including a step of purification, evaporation-decarbonation, crystallization, centrifugation and drying. Patent application US 2020/0002183 describes an integrated process for the production of sodium bicarbonate from $CO_2$ captured by a dry carbonation process from trona as raw material and converting it into sodium carbonate. Part of the sodium carbonate is recycled as sorbent in the $CO_2$ capture process and the rest is used together with part of the captured $CO_2$ for the production of sodium bicarbonate.

However, high thermal energy is necessary. The use of trona as raw material, which is available only at few locations in the world may increase the economic cost. A total conversion of trona to sodium carbonate is needed, followed by another carbonation step to produce sodium bicarbonate and the process thus implies a high energy consumption.

There is thus a need for a process that allows the production of sodium bicarbonate with a high purity while avoiding high energy consumption, being environmentally friendly and economically viable.

The purpose of the present invention is thus to provide a continuous process based on $CO_2$ capture and revalorization using membrane technology. First, the $CO_2$-containing gas from the industry is contacted with a base solution that absorbs the $CO_2$ present in the gas stream. Then, the resulting $CO_2$-containing solution is sent to a membrane distillation-crystallization step where bicarbonate crystals are produced.

Advantageously, all the steps are implemented at room temperature or low temperature (<50° C.) and sodium bicarbonate crystals are obtained with a high purity and low energy consumption.

SUMMARY

The present invention thus relates to a continuous process for the production of sodium bicarbonate crystals, comprising:
1) an absorption step of the gaseous carbon dioxide from a gas stream into an aqueous solution comprising a sodium carbonate salt, comprising the steps of:
    1a) contacting said gas stream with a first surface of a first porous membrane contactor; and contacting said aqueous solution of sodium carbonate with a second opposite surface of the same first porous membrane contactor, said gaseous carbon dioxide diffusing through the pores of the membrane into said aqueous solution of sodium carbonate where it dissolves; and
    1b) reacting the dissolved carbon dioxide with the sodium carbonate salt in the aqueous solution to produce an aqueous solution of sodium bicarbonate; said absorption step being performed in the presence of at least one mass transfer promoter selected from an amino acid or an enzyme;

said at least one mass transfer promoter being in suspension in the aqueous solution of sodium carbonate or immobilized on said first porous membrane contactor, then 2) a crystallization step of sodium bicarbonate salt, comprising the steps of:
   2a) circulating the aqueous solution containing the sodium bicarbonate at one side of a second porous membrane contactor;
   2b) applying a driving force by circulating an extracting fluid at the opposite side of the second porous membrane contactor, so that the water of the aqueous solution evaporates and diffuses through the pores of the second porous membrane contactor towards the extracting fluid at the opposite side of the second porous membrane contactor, where it re-condensates, leading to the progressive concentration of the aqueous solution of sodium bicarbonate,
   2c) sending the concentrated aqueous solution of sodium bicarbonate to a crystallization tank at the outlet of the second porous membrane contactor where crystal growth takes place; and
   2d) recovering the sodium bicarbonate crystals,
wherein said first porous membrane contactor and second porous membrane contactor are in series.

According to one embodiment, the at least one mass transfer promoter is an amino acid selected from L-arginine, 6-aminohexionine, L-valine, L-methionine and L-serine.

According to another embodiment, the at least one mass transfer promoter is carbonic anhydrase.

According to one embodiment, the concentration of the mass transfer promoter is between 0.1 mg/L and 1 mg/L, preferably between 0.1 mg/L and 0.5 mg/L.

According to one embodiment, the continuous process further comprises a step of pre-filtrating said mass transfer promoter in suspension in the solvent through a filtering membrane.

According to one embodiment, the gas stream is a flue gas from fossil fuel combustion, a flue gas from biofuel combustion, a gas from natural source or a combination thereof.

According to one embodiment, the concentration of the gaseous carbon dioxide in the gas stream is between 5 vol % and 40 vol %, preferably between 5 vol % and 20 vol %.

According to one embodiment, the concentration of the sodium carbonate salt in the aqueous solution comprising a sodium carbonate salt is between 0.1 mol/L and 2.0 mol/L, preferably between 0.1 mol/L and 1.0 mol/L.

According to one embodiment, the Reynolds number for the gas stream is between about 2 and about 15, preferably between about 2 and about 10, more preferably between about 5 and about 10.

According to one embodiment, the Reynolds number for the aqueous solution comprising a sodium carbonate salt is between about 2 and about 30, preferably between about 2 and about 25, more preferably between about 10 and about 25.

According to one embodiment, the extracting fluid is selected from a liquid, a mixture of liquids, a concentrated aqueous solution of one or more salts, a gas, a gas mixture or vacuum.

The present invention further relates to a system for the production of sodium bicarbonate crystals from carbon dioxide of a gas stream, comprising:
   a control unit configured to control the gas and/or liquid flow rate, and the gas and/or liquid temperatures;
   an absorption unit comprising a first porous membrane contactor configured to allow contact between a gas stream containing gaseous carbon dioxide and a solvent which is an aqueous solution of sodium carbonate; and a gear pump, wherein the gas stream and the solvent are separated by said first porous membrane contactor, and wherein said first porous membrane contactor contains means for diffusing the gaseous carbon dioxide of the gas stream towards the solvent, where it dissolved and react with the sodium carbonate to produce sodium bicarbonate, said means being pores; and
   a crystallization unit comprising a second porous membrane contactor configured to allow contact between the aqueous solution containing the sodium bicarbonate to be crystallized coming from the absorption unit and an extracting fluid; a permeate tank containing the extracting fluid; and a crystallization tank where the crystallization takes place,
wherein the second membrane contactor is fluidically coupled to the crystallization tank and to the permeate tank,
wherein the water of the aqueous solution containing the sodium bicarbonate to be crystallized coming from the absorption unit circulates at one side of the second porous membrane contactor toward the crystallization tank and the extracting fluid coming from the permeate tank circulates at the opposite side of the second porous membrane contactor, and wherein said second porous membrane contactor contains means for the selective transport of the water of the aqueous solution towards the opposite side, said means being pores,
wherein said absorption unit and crystallization unit are fluidically coupled.

In an embodiment, the system of the invention further comprises a pre-filtration unit, fluidically coupled to the absorption unit and/or the crystallization unit.

Definitions

In the present invention, the following terms have the following meanings:

The term "about" preceding a figure means plus or less 10% of the value of said figure.

The term "continuous process" refers to a production method that can be implemented without interruption, i.e. the fluids that are being processed are continuously in motion, undergoing chemical reactions and/or subject to mechanical and/or heat treatment.

The term "carbonic anhydrase (CA)" refers to a metalloenzyme that can catalyze the conversion of $CO_2$ to bicarbonate at an extremely high turnover, which may reach up to rate of $10^6$ per second. It is found in humans, animals, plants and microbes. The carbonic anhydrase may be selected from a $\alpha$-CA, $\beta$-CA, $\gamma$-CA, $\delta$-CA or $\zeta$-CA.

The term "driving force" refers to the force that allows the mass transfer through the pores of the membrane contactor. According to the invention, the driving force is selected from a temperature gradient, a concentration gradient, a partial pressure gradient or a mixture thereof. The driving force is produced by circulating an extracting fluid at one side of the membrane contactor provoking a difference of concentration or partial pressure at both sides of the membrane. According to the invention, the extracting fluid is selected from a liquid, a mixture of liquids, a concentrated aqueous solution of one or more salts, a gas, a gas mixture or vacuum.

The "Reynolds number" refers to a dimensionless number that predicts if a flow is laminar (Re<2500) or turbulent (Re>5000).

The "transmembrane flux of the gas J" refers to the mass transfer flux of the $CO_2$ comprised in the gas stream across the first porous membrane contactor. According to one embodiment, the transmembrane flux J scales as function of equation (1):

$$J=(G_{in} \times C_{in} - G_{out} \times C_{out})/Am, \quad (1)$$

where $C_{in}$ and $C_{out}$ are the $CO_2$ concentrations, in the gas at inlet and at outlet of the first porous membrane contactor, and $G_{in}$ and $G_{out}$ are the gas voluminal flow rates at inlet and outlet, and Am is the membrane area.

The "driving force of the carbon dioxide $\Delta Cm$" scales as function of equation (2):

$$\Delta Cm=(C_{in}-C_{out})/\ln(C_{in}/C_{out}), \quad (2)$$

where $C_{in}$ and $C_{out}$ are the $CO_2$ concentrations, in ppm, in the gas at inlet and the outlet of the first porous membrane contactor.

The "transmembrane flux of the water J'" refers to the mass transfer flux of the water of the aqueous solution across the first membrane contactor. J' is determined by measuring the weight of the permeate tank over time. The flux is then extracted via equation (3)

$$J' = -\frac{1}{A\rho}\frac{dwp}{dt} \quad (3)$$

Where A is the membrane area, t is the time, $\rho$ is the permeate density, wp is the weight at permeate side.

DETAILED DESCRIPTION

Process

Figure 1:
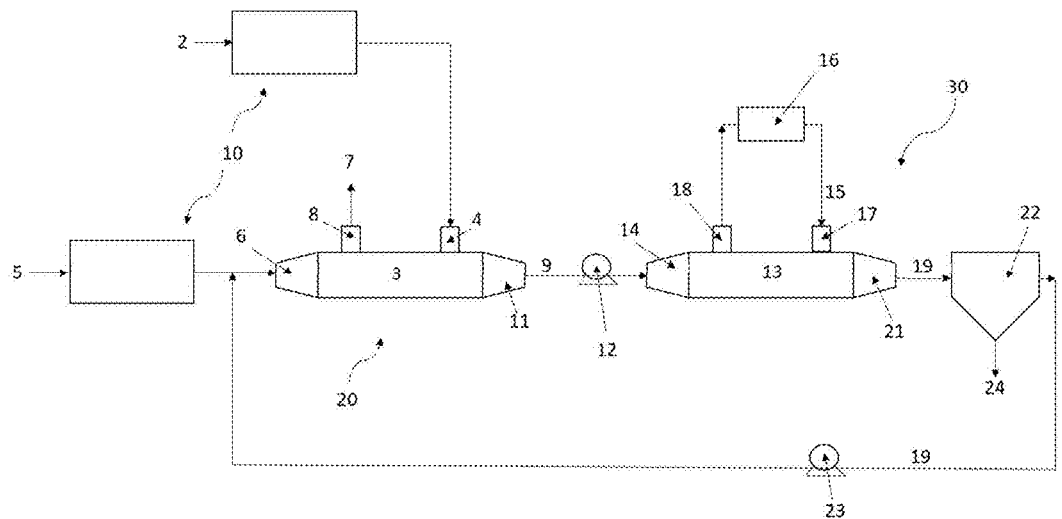
FIG. 1 is a flow diagram showing the steps of the continuous process according to one embodiment of the present invention.

This invention relates to a continuous process for the production of salt crystals, comprising the steps of contacting a gas stream comprising at least one gas with a solvent that absorbs at least part of the gas, then, sending the resulting solution to a membrane distillation-crystallization step where salt crystals are produced.

According to one embodiment, the invention relates to a continuous process for the production of salt crystals comprising the following steps:
1) an absorption step of at least part of at least one gas comprised in a gas stream into a solvent, to produce an aqueous solution of a salt to be crystallized, and
2) a crystallization step of the salt to be crystallized comprised in the aqueous solution of a salt to be crystallized obtained at step 1).

According to one embodiment, this invention relates to a continuous process for the production of sodium bicarbonate crystals, comprising the steps of contacting a $CO_2$-containing gas with a basic solution that absorbs the $CO_2$, then, sending the resulting $CO_2$-containing solution to a membrane distillation-crystallization step where bicarbonate crystals are produced.

In a particular embodiment, the invention relates to a continuous process for the production of sodium bicarbonate crystals, comprising:
1) an absorption step of at least part of the carbon dioxide from a gas stream into an aqueous solution comprising a sodium carbonate salt to produce an aqueous solution of sodium bicarbonate, then
2) a crystallization step of the sodium bicarbonate salt comprised in the aqueous solution of sodium bicarbonate obtained at the first step.

Absorption Step

According to one embodiment, the first step is performed by contacting a gas stream with a first surface of a first porous membrane contactor and contacting a solvent with a second opposite surface of said first porous membrane contactor.

Advantageously, the physical separation between the solvent and the gas stream which may be provided by the first porous membrane contactor removes the problems of foaming and channeling encountered in conventional solvent absorption where gas and liquid are in direct contact.

According to one embodiment, the gas comprised in the gas stream is an acidic gas selected from carbon dioxide, sulfur dioxide, sulfur trioxide, hydrogen sulfide, carbon oxysulfide, carbon disulfide, mercaptans, nitric oxide, nitric dioxide, fluorides, hydrochloric acid or a mixture thereof.

According to another embodiment, the gas comprised in the gas stream is a basic gas selected from ammonia.

According to a preferred embodiment, the gas comprised in the gas stream is a gaseous carbon dioxide.

According to one embodiment, the gas stream is a flue gas from fossil fuel combustion, a flue gas from biofuel combustion, a gas from natural source or a combination thereof.

The concentration of the gas comprised in the gas stream may vary in a wide range between 0 and 100 vol %, 0 vol % being excluded. Said concentration may be between 0 and 10 vol %, 0 being excluded, between 10 and 20 vol %, between 20 and 30 vol %, between 30 and 40 vol %, between 40 and 50 vol %, between 50 and 60 vol %, between 60 and 70 vol %, between 70 and 80 vol %, between 80 and 90 vol %, or between 90 and 100 vol %.

According to one embodiment, the concentration of the gas comprised in the gas stream is between 5 vol % and 40 vol %. According to one embodiment, the concentration of the gas comprised in the gas stream is between 5 vol % and 20 vol %. According to one embodiment, the concentration of the gas comprised in the gas stream is between 10 vol % and 20 vol %.

According to a particular embodiment, the concentration of the gaseous carbon dioxide in the gas stream is between 5 vol % and 40 vol %. According to a particular embodiment, the concentration of the gaseous carbon dioxide in the gas stream is between 5 vol % and 20 vol %. According to a particular embodiment, the concentration of the gaseous carbon dioxide in the gas stream is between 10 vol % and 20 vol %.

According to one embodiment, the solvent is an aqueous solution of one or more salts selected from alkaline salts, ammonium salts, alkanolamine salts, alkaline-earth salts or a mixture thereof.

According to one embodiment, the solvent is an aqueous solution of one or more alkaline salts selected from sodium carbonate, calcium carbonate, sodium acetate, potassium cyanide, sodium sulfide, sodium bicarbonate, calcium hydroxide, magnesium hydroxide or sodium hydroxide. In a preferred embodiment, the solvent is an aqueous solution of sodium carbonate.

According to one embodiment, the gas comprised in the gas stream diffuses through the pores of the first porous membrane contactor, driven by its concentration gradient, towards said solvent where at least part of it dissolves to give the gas in solution.

According to a particular embodiment, the gaseous carbon dioxide in the gas stream diffuses through the pores of the first porous membrane contactor, driven by its concentration gradient, towards said solvent where at least part of it dissolves to give carbon dioxide in solution.

According to a particular embodiment in which the solvent is an aqueous solution of one or more salts, the dissolved gas then reacts with said one or more salts to produce one or more different salt(s), which is (are) designated as "salt(s) to be crystallized" in the present invention.

According to one embodiment, the one or more salts to be crystallized is selected from sodium bicarbonate, sodium carbonate, calcium carbonate, bicarbonate de calcium, magnesium carbonate, sodium sulfate or ammonium sulfate.

According to a preferred embodiment, the salt to be crystallized is sodium bicarbonate.

According to a particular embodiment in which the solvent is an aqueous solution of sodium carbonate, the dissolved carbon dioxide then reacts with the sodium carbonate in the aqueous solution to produce sodium bicarbonate according to the reaction (1.1):

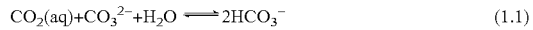

$$CO_2(aq) + CO_3^{2-} + H_2O \rightleftharpoons 2HCO_3^- \qquad (1.1)$$

According to one embodiment, the mass transfer between the gas comprised in the gas stream and the solvent occurs in three steps:

a) diffusion from the bulk gas phase to the gas-membrane interface;
b) diffusion through the membrane pores; and
c) transfer from the liquid-membrane interface to the bulk liquid phase through a liquid boundary layer, which is the layer of liquid in the immediate vicinity of the first porous membrane contactor.

According to one embodiment, the mass transfer between the gas comprised in the gas stream and the solvent is characterized by the overall mass transfer coefficient ($K_{ov}$).

According to one embodiment, the overall mass transfer coefficient scales as function of equation (4) shown below, $$K_{ov} = J/\Delta Cm, \qquad (4)$$

wherein J is the transmembrane flux of the gas comprised in gas stream through the first porous membrane contactor and $\Delta Cm$ is the driving force of the gas absorption.

Several parameters may influence the mass transfer of the gas comprised in the gas stream toward the solvent such as the Reynolds number (Re) for both the gas and liquid phases, the driving force between the gas flow and the solvent, the solvent and gas flow rates in the first porous membrane contactor, the composition of the gas phase, the concentration of the salt in the solvent and the temperature.

According to one embodiment, the Reynolds number for the gas stream, preferably flowing within the shell side, scales as function of equation (5) shown below:

$$Re = \rho v dh/\mu \qquad (5)$$

According to the embodiment where the first porous membrane contactor is shaped as a hollow fiber, the Reynolds number for the solvent, preferably flowing within the lumen side, scales as function of equation (6) shown below:

$$Re = \rho v di/\mu, \qquad (6)$$

Wherein, $\rho$ is the fluid density in kg/m³, v is the fluid velocity in m/s, $\mu$ is the dynamic viscosity in Pa·s, di is the inner fiber diameter, dh is the hydraulic diameter (dh=4A/P with A=cross-sectional area and P is the wetted perimeter of the cross section).

According to one embodiment, the Reynolds number for the gas stream is between about 2 and about 15. In one embodiment, the Reynolds number for the gas stream is between about 2 and about 10. In one embodiment, the Reynolds number for the gas stream is between about 5 and about 10. In one embodiment, the Reynolds number for the gas stream is of about 5, about 6, about 7, about 8, about 9, about 10. In a preferred embodiment, the Reynolds number for the gas stream is of about 9.

According to one embodiment, the Reynolds number for the solvent is between about 2 and about 30. In one embodiment, the Reynolds number for the solvent is between about 2 and about 25. In one embodiment, the Reynolds number for the solvent is between about 10 and about 25. In one embodiment, the Reynolds number for the solvent is of about 10, about 11, about 12, about 13, about 14, about 15, about 16, about 17, about 18, about 19, about 20, about 21, about 22, about 23, about 24, about 25. In a preferred embodiment, the Reynolds number for the solvent is of about 20.

According to one embodiment, the concentration of the salt, preferably the sodium carbonate salt, in the solvent is between 0.1 mol/L and 2.0 mol/L. In one embodiment, the concentration of the salt in the solvent is between 0.1 mol/L and 1.0 mol/L. In one embodiment, the concentration of the salt in the solvent is 0.1 mol/L, 0.2 mol/L, 0.3 mol/L, 0.4 mol/L, 0.5 mol/L, 0.6 mol/L, 0.7 mol/L, 0.8 mol/L, 0.9 mol/L, 1.0 mol/L. In a preferred embodiment, the concentration of the salt in the solvent is 0.5 mol/L.

According to one embodiment, the solvent flows co-currently to the gas stream. In a preferred embodiment, the solvent flows counter-currently to the gas stream.

Advantageously, by increasing the gas stream and/or solvent flow rate, the boundary layer decrease diminishes the resistances towards mass transfer, enhancing the gas flux, especially the gaseous carbon dioxide flux, which results in an enhanced mass transfer coefficient across the membrane. Nevertheless, there is an optimal value of Reynolds, calculable by the skilled artisan.

According to one embodiment, the absorption step 1) is performed at a temperature between 15° C. and 40° C. In one embodiment, the absorption step is performed at a temperature between 20° C. and 35° C. In one embodiment, the absorption step is performed at a temperature of 20° C., 21° C., 22° C., 23° C., 24° C., 25° C., 26° C., 27° C., 28° C., 29° C., 30° C., 31° C., 32° C., 33° C., 34° C., 35° C. In one embodiment, the absorption step is performed at a temperature of 35° C.

According to one embodiment, the overall mass transfer coefficient for the absorption step 1) is between 0,001 m/min and 0.1 m/min. In one embodiment, the overall mass transfer for the absorption step is between 0,001 m/min and 0.01 m/min. In one embodiment, the overall mass transfer for the absorption step is between 0,001 m/min and 0.0085 m/min. In one embodiment, the overall mass transfer for the absorption step is between 0,001 m/min and 0.0025 m/min.

According to one embodiment, the absorption step 1) is performed in the presence of at least one mass transfer promoter.

Advantageously, the mass transfer promoter allows for an increase of the overall mass transfer coefficient.

According to one embodiment, the at least one mass transfer promoter is selected from an amino acid or an enzyme that catalysis the gas conversion to the salt to be crystallized.

According to one embodiment, the at least one mass transfer promoter is an amino acid selected from L-arginine, 6-aminohexanoic acid, L-valine, L-methionine and L-serine. According to a preferred embodiment, the at least one mass transfer promoter is L-arginine.

According to another preferred embodiment, the at least one mass transfer promoter is an enzyme selected from any enzyme using carbon dioxide as substrate, and in a preferred embodiment, carbonic anhydrase that catalyzes the carbon dioxide conversion to the sodium carbonate.

In one embodiment, the enzyme is selected in table 1 below:

TABLE 1

| No. | Enzymes |
|---|---|
| 1. | Carbonic anhydrase |
| 2. | Formate dehydrogenase |
| 3. | Carbon monodioxide dehydrogenase |
| 4. | 4-Hydroxybenzoate decarboxylases |
| 5. | 3,4-Dihydroxy-benzoate decarboxylase |
| 6. | 2,6-Dihydroxybenzoate decarboxylases |
| 7. | Pyrrole-2-carboxylate decarboxylase |
| 8. | Pyruvate decarboxylase |
| 9. | 1,5-bisphosphate ribulose bisphosphate carboxylase (RubisCO) |
| 10. | Pyruvate synthase |

Advantageously, the use of a carbonic anhydrase allows an increase of the gaseous carbon dioxide absorption rate by catalyzing the conversion of the carbon dioxide to bicarbonate at an extremely high turnover rate, which may reach up to $10^6$ per second.

In one embodiment, more than one substrate is used; in the embodiment where two substrates are used the second substrate may be in the liquid phase.

According to one embodiment, the at least one mass transfer promoter is in suspension in the solvent, preferably the aqueous solution of one or more salt, in particular the aqueous solution of sodium carbonate.

According to one embodiment, the at least one mass transfer promoter is in suspension in the solvent at a concentration between 0.1 mg/L and 1 mg/L. According to one embodiment, the at least one mass transfer promoter is in suspension in the solvent at a concentration between 0.1 mg/L and 0.5 mg/L.

According to another embodiment, when the at least one mass transfer promoter is an enzyme, said enzyme may be immobilized on said first porous membrane contactor.

Advantageously, immobilization of the enzyme improves its recovery and reusability.

Crystallization Step

According to one embodiment, the salt to be crystallized comprised in the aqueous solution of a salt to be crystallized obtained at the first step is then crystallized by membrane crystallization in crystallization step 2). According to a preferred embodiment, the sodium bicarbonate salt comprised in the aqueous solution of a salt to be crystallized obtained at the first step is then crystallized by membrane crystallization.

According to one embodiment, the second step is performed by circulating the aqueous solution containing the salt to be crystallized, preferably the aqueous solution of sodium bicarbonate, obtained at the first step, at one side of a second porous membrane contactor and applying a driving force by circulating an extracting fluid at the opposite side of the second porous membrane contactor.

According to one embodiment, a vapor/liquid interface is generated at the mouth of the pores of the second porous membrane contactor and the water of the aqueous solution of a salt to be crystallized, evaporates and diffuses through the pores of the second porous membrane contactor towards the extracting fluid at the opposite side of the second porous membrane contactor, where it re-condensates, leading to the progressive concentration of the aqueous solution containing the salt to be crystallized.

According to one embodiment, the concentrated aqueous solution containing the salt to be crystallized, preferably sodium bicarbonate salt, is sent to a crystallization tank at the outlet of the second porous membrane contactor where crystal growth takes place (step 2c) and salt crystals, preferably sodium bicarbonate crystals, are recovered (step 2d), for instance using vacuum filtration.

According to one embodiment, the driving force is selected from a temperature gradient, a concentration gradient, a partial pressure gradient or any mixture thereof.

According to one embodiment, the extracting fluid is selected from a liquid, a mixture of liquids, a concentrated aqueous solution of one or more salts, a gas, a gas mixture or vacuum.

According to a particular embodiment, the extracting fluid is a condensing fluid such as pure water. In this embodiment, the driving force is the difference of temperature between the solvent containing the salt to be crystallized and the condensing fluid.

According to a particular embodiment, the extracting fluid is an osmotic solution. In this embodiment, the driving force is the difference of concentration at both sides of the second porous membrane contactor.

According to a particular embodiment, the extracting fluid is air. In this embodiment, the driving force is the partial pressure gradient across the second porous membrane contactor.

According to a particular embodiment, the extracting fluid is a sweep gas. In this embodiment, the driving force is the partial pressure gradient across the second porous membrane contactor.

According to a particular embodiment, the extracting fluid is vacuum. In this embodiment, the driving force is the partial pressure gradient across the second porous membrane contactor.

Advantageously, both sides of the second porous membrane contactor are independent, it is therefore possible to modify independently the operation conditions on both sides of the second membrane contactor in order to control the crystallization kinetics, leading to the formation of specific crystalline morphologies and structures that are not easily achievable with conventional crystallization.

According to one embodiment, the mass transfer between the solvent and the extracting fluid is characterized by the overall mass transfer coefficient ($K_{ov}$).

According to one embodiment, the overall mass transfer coefficient for the crystallization step scales as function of equation (7), $$K_{ov} = J''/\Delta p^*, \tag{7}$$

wherein J' is the transmembrane flux of the water of the aqueous solution through the membrane and $\Delta p^*$ is the vapor pressure difference between the aqueous solution of sodium bicarbonate and the extracting fluid.

Several parameters may influence the mass transfer of the water of the aqueous solution toward the extracting fluid such as the Reynolds number (Re) for both the aqueous solution and the extracting fluid, the flow rates of the aqueous solution, the flow rate of extracting fluid in the membrane contactor, the aqueous solution concentration or the temperature of the aqueous solution and the extracting fluid.

According to one embodiment, the Reynolds number for the aqueous solution of the salt to be crystallized, preferably of sodium bicarbonate, obtained in step 1) is between 2 and 20. In one embodiment, the Reynolds number for the aqueous solution of the salt to be crystallized is between about 5 and about 20. In one embodiment, the Reynolds number for the aqueous solution of the salt to be crystallized is between about 5 and about 15. According to one embodiment, the Reynolds number for the aqueous solution of the salt to be crystallized is of about 5, about 6, about 7, about 8, about 9, about 10, about 11, about 12, about 13, about 14, about 15. In a preferred embodiment, the Reynolds number for the aqueous solution of the salt to be crystallized is of about 7.

According to one embodiment, the Reynolds number for the extracting fluid is between 2 and 20. In one embodiment, the Reynolds number for the extracting fluid is between about 2 and about 10. In one embodiment, the Reynolds number for the extracting fluid is between about 10 and about 20. According to one embodiment, the Reynolds number for the extracting fluid is of about 2, about 3, about 4, about 5, about 6, about 7, about 8, about 9, about 10, about 11, about 12, about 13, about 14, about 15. In a preferred embodiment, the Reynolds number for the extracting fluid is of about 3. In another preferred embodiment, the Reynolds number for the extracting fluid is of about 15.

According to one embodiment, the aqueous solution of the salt to be crystallized, preferably the aqueous solution of sodium bicarbonate, is at a temperature ranging from 15° C. to 50° C. In one embodiment, the aqueous solution of the salt to be crystallized is at a temperature ranging from 15° C. to 40° C. In one embodiment, the aqueous solution of the salt to be crystallized is at a temperature ranging from 15° C. to 30° C. In one embodiment, the aqueous solution of the salt to be crystallized is at a temperature of 15° C., 16° C., 17° C., 18° C., 19° C., 20° C., 21° C., 22° C., 23° C., 24° C., 25° C., 26° C., 27° C., 28° C., 29° C., 30° C. In one embodiment, the aqueous solution of the salt to be crystallized is at a temperature of 25° C.

According to one embodiment, the extracting fluid is at a temperature ranging from 2° C. to 25° C. In one embodiment, the extracting fluid is at a temperature ranging from 2° C. to 15° C.

According to one embodiment, the overall mass transfer coefficient for the crystallization step is between $2.10^{-11}$ m/Pa/s and $10.10^{-11}$ m/Pa/s. In one embodiment, the overall mass transfer for the crystallization step is between $2.10^{-11}$ m/Pa/s and $7.10^{-11}$ m/Pa/s. In one embodiment, the overall mass transfer for the crystallization step is between $4.10^{-11}$ m/Pa/s and $10.10^{-11}$ m/Pa/s. In one embodiment, the overall mass transfer for the crystallization step is between $4.10^{-11}$ m/Pa/s and $7.10^{-11}$ m/Pa/s.

According to one embodiment, at least 10% of the salt to be crystallized, preferably the sodium bicarbonate present in the aqueous solution of the salt to be crystallized obtained in step 1), is crystallized in step 2). In one embodiment, at least 20% of the salt to be crystallized is crystallized. In one embodiment, at least 30% of the salt to be crystallized is crystallized. In one embodiment, at least 40% of the salt to be crystallized is crystallized. In one embodiment, at least 50% of the salt to be crystallized is crystallized. In one embodiment, at least 60% of the salt to be crystallized is crystallized. In one embodiment, at least 70% of the salt to be crystallized is crystallized. In one embodiment, at least 80% of the salt to be crystallized is crystallized. In one embodiment, at least 90% of the salt to be crystallized is crystallized. In one embodiment, 100% of the salt to be crystallized is crystallized.

According to one embodiment, salt crystals, preferably sodium bicarbonate crystals are obtained with a purity higher than 99%.

Advantageously, the crystallization kinetics and the final morphology and structure of the crystalline materials can be easily controlled by acting on process parameters such as concentration, flow rate, temperature, as well as the membrane type.

According to one embodiment, the first and second membrane contactors are in series, providing a continuous process.

Advantageously, the continuous process of the present invention can operate at room temperature or low temperature (<50° C.), reducing the energy consumption compared to traditional processes for the production salt crystals, in particular sodium bicarbonate crystals.

Moreover, the salt crystals, in particular sodium bicarbonate crystals, are directly usable, bringing an economic value to the process of the present invention.

Membrane Contactor

According to one embodiment, the first and/or second membrane contactors are independently hydrophobic membranes comprising a first surface and a second surface opposite to the first surface.

According to one embodiment, the first and/or second membrane contactors are independently shaped as a flat sheet. According to one embodiment, the first and/or second membrane contactors are independently shaped as spiral membrane contactor. According to a preferred embodiment, the first and/or second membrane contactor are independently shaped as a hollow fiber.

Advantageously, hollow fiber membrane contactors have higher specific surface area, increasing the mass transfer from one side to the other.

According to one embodiment, the first and/or second membrane contactors are independently shaped as a plurality of hollow fibers.

According to one embodiment, the first surface of the first and/or second membrane contactors is the internal surface of the hollow fiber and the second opposite surface is the external surface of the hollow fiber.

According to another embodiment, the first surface of the first and/or second membrane contactors is the external surface of the hollow fiber and the second opposite surface is the internal surface of the hollow fiber.

According to one embodiment, said plurality of hollow fibers are packed in a tube-and-shell arrangement.

According to one embodiment, the gas stream flows through the lumen side of the first membrane contactor and the solvent flows through the shell side. According to another embodiment, the gas stream flows through the shell side of the first membrane contactor and the solvent flows through the lumen side of the first membrane contactor.

According to one embodiment, the solvent containing the salt to be crystallized flows through the lumen side of the second membrane contactor and the extracting fluid flows through the shell side of the second membrane contactor. According to another embodiment, the solvent containing the salt to be crystallized flows through the shell side of the second membrane contactor and the extracting fluid flows through the lumen side of the second membrane contactor.

In one embodiment, the first and/or second membrane have a thickness between 10 µm and 100 µm, preferably between 40 µm and 50 µm.

According to one embodiment, the first and/or second membrane contactors include microporous membranes. According to one embodiment, the first and/or second membrane contactors have membranes with a plurality of micro-pores with a mean diameter between 0.03 µm and 0.1 µm, preferably micro-pores with a surface of 0.03×0.1 µm.

According to one embodiment, the first and/or second membrane are independently made of a polymer selected from polyene, polyalkene, polysulfone (PSU), polyethersulfone (PES), perfluoropolymers, Polyetherimide (PEI), Polymethylpentene (PMP), Polydimethyl siloxane (PDMS).

According to a preferred embodiment, the first and/or second membrane are independently made of a polymer selected from polypropylene (PP), polyethylene (PE), polymethylpentene (PMP), polyvinylidene fluoride (PVDF), polytetrafluoroethylene (PTFE), and polyetheretherketone (PEEK).

Pre-Filtration Step

According to one embodiment, when the at least one mass transfer promoter is in suspension in the solvent, the continuous process of the present invention further comprises a step of pre-filtrating said mass transfer promoter in suspension in the solvent through a filtering membrane.

According to one embodiment, once recovered, the filtered mass transfer promoter may be resuspended in the solvent used in absorption step 1) for reuse.

According to one embodiment, the step of pre-filtrating said mass transfer promoter is performed after the absorption step. This embodiment is advantageous when the mass transfer promoter is an enzyme.

According to another embodiment, the step of pre-filtrating said mass transfer promoter is performed after the crystallization step. This embodiment is advantageous when the mass transfer promoter is an amino acid, as the amino acid may help for the salt crystallization, especially for the crystallization of sodium bicarbonate.

The embodiments presented hereinabove for the process of the invention apply mutatis mutandis to the whole description and in particular to all the embodiments described hereinbelow for the system of the invention of the application.

System

The invention also relates to a system 1 for the production of salt crystals from a gas comprised in a gas stream, comprising a control unit 10, an absorption unit 20 and a crystallization unit 30.

According to one embodiment, the control unit 10 is configured to control the flow rate of the different fluids and optionally their temperatures.

According to one embodiment, the absorption unit 20 is configured to allow the absorption of the gas comprised in a gas stream into a solvent which is an aqueous solution of one or more salt.

According to one embodiment, the absorption unit 20 comprises a first porous membrane contactor configured to allow contact between the gas stream and the solvent; and a gear pump.

According to one embodiment, the gas comprised in the gas stream diffuses through the pores of the first porous membrane contactor towards said solvent, where it dissolved and react with at least one salt to produce at least one salt to be crystallized.

According to one embodiment, the crystallization unit 30 is configured to allow crystallization of the at least one salt to be crystallized coming from the absorption unit 20.

According to one embodiment, the crystallization unit 30 comprises a second porous membrane contactor configured to allow the contact between the aqueous solution containing the at least one salt to be crystallized and an extracting fluid; a permeate tank containing the extracting fluid; and a crystallization tank, where the crystallization of the at least one salt to be crystallized takes place.

According to one embodiment, the water of the aqueous solution containing the at least one salt to be crystallized evaporates and diffuses through the pores of the second porous membrane contactor towards the extracting fluid circulating at the opposite side of the second porous membrane contactor, where it re-condensate, leading to the progressive concentration of the aqueous solution containing the salt to be crystallized.

In such an embodiment where a crystallization tank is present, most of the crystallization, especially crystal growth, takes place in the crystallization tank. Nevertheless, some nucleation and some crystal growth may also take place in the crystallization unit 30 before the concentrated aqueous solution comprising the salt to be crystallized enters the crystallization tank.

According to one embodiment, the absorption unit 20 and the crystallization unit 30 are fluidically coupled so that the aqueous solution containing the at least one salt to be crystallized coming from the absorption unit 20 flows continuously from the absorption unit 20 to the crystallization unit 30.

According to one embodiment, the system further comprises a pre-filtration unit 40, wherein the pre-filtration step of the mass transfer promoter as detailed above may be performed. Said pre-filtration unit 40 is preferably fluidically coupled to the absorption unit 20 and/or to the crystallization unit 30.

Advantageously, the system of the present invention allows for a continuous treatment, with low energy consumption, of a gas stream such as a flue gas from fossil fuel combustion, a flue gas from biofuel combustion, a gas from natural source or a combination thereof, allowing the capture of a gas, in particular carbon dioxide, and revalorization into salt crystals, in particular sodium bicarbonate crystals.

Another advantage of the system of the present invention as described hereinbelow is its modularity and high flexibility. The number and arrangement of the membrane contactors may be easily adapted according to needs and thus reduce energy costs, allowing a straightforward linear scale-up and modular design. An increase in capacity may be simply achieved by adding membrane modules.

FIG. 1 illustrates a particular embodiment of the implementation of the process of the present invention using the system 1, in which a gas stream 2 enters the first porous membrane contactor 3 of the absorption unit 20 via a first inlet opening 4 located at one side of the first porous membrane contactor. The solvent 5, containing at least one mass transfer promoter, enters the first porous membrane contactor 3 via a second inlet opening 6 located at the other side of the first porous membrane contactor and flows counter-currently to the gas stream. After the gas comprised in the gas stream is absorbed by the solvent 5, the resulting gas-depleted gas stream 7 is released from the first porous membrane contactor 3 via a first outlet opening 8 located at the opposite side of the first inlet opening 4. The solvent 9, containing the salt to be crystallized and at least one mass transfer promoter, exits the first porous membrane contactor 3 via a second outlet opening 11 located at the opposite side of the second inlet opening 6 and is then sent to the crystallization unit 30 by mean of gear pump 12.

As illustrated in FIG. 1, the solvent 9, containing the salt to be crystallized and at least one mass transfer promoter, enters the second porous membrane contactor 13 via a first inlet opening 14 located at one side of the second porous membrane contactor. The extracting fluid 15 coming from a permeate tank 16 is sent to the second porous membrane contactor 13 by means of gear pump (not represented) and enters the second porous membrane contactor 13 via a second inlet opening 17 located at the other side of the second porous membrane contactor and flows counter-currently to the $CO_2$-containing solvent 9. The extracting fluid 15 exits the second porous membrane contactor 13 via a second outlet opening 18 located at the opposite side of the second inlet opening 17 and is cycled back to the permeate tank for reuse.

Still referring to FIG. 1, after the solvent 9, containing the salt to be crystallized and at least one mass transfer promoter, evaporates toward the extracting fluid 15 inside the second porous membrane contactor 13, the resulting concentrated solvent 19, containing the salt to be crystallized and at least one mass transfer promoter, exits the second porous membrane contactor 13 via a first outlet opening 21 located at the opposite side of the first inlet opening 14 and is then sent to the crystallization tank 22 where the crystallization takes place. After crystallization, the remaining concentrated solvent 19, containing the salt to be crystallized and at least one mass transfer promoter is cycled back to the absorption unit 20, by means of a gear pump 23, for reuse without further treatment and salts crystals 24 are recovered using vacuum filtration.

Figure 2:
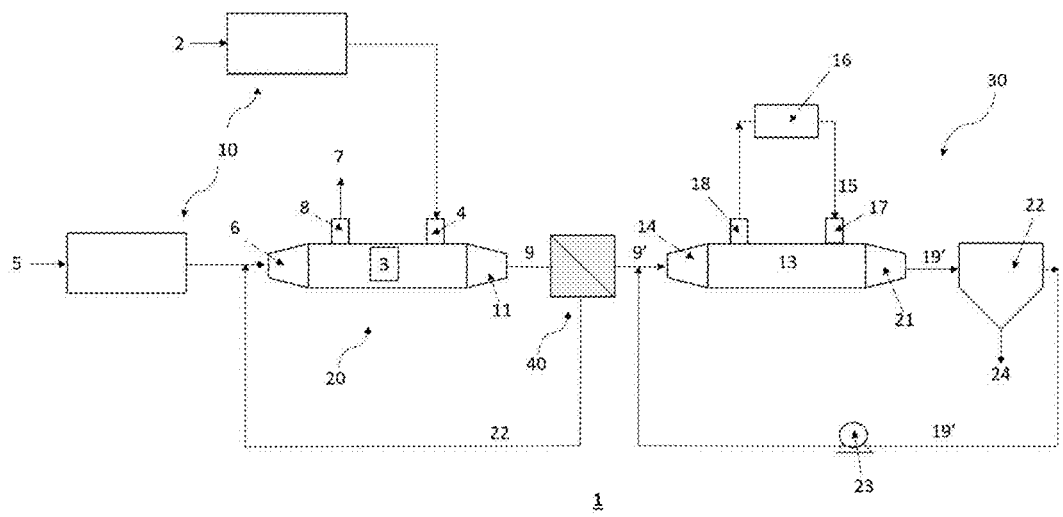
FIG. 2 is a flow diagram showing the steps of the continuous process according to another embodiment of the present invention.

FIG. 2 illustrates another particular embodiment of the implementation of the process of the present invention using the system 1, in which the system 1 further comprises a pre-filtration unit 40, fluidically coupled to the absorption unit and to the crystallization unit.

In this embodiment as illustrated in FIG. 2, the solvent 9, containing the salt to be crystallized and at least one mass transfer promoter, exits the first porous membrane contactor via the second outlet opening 11 and is then sent to the pre-filtration unit 40, where the at least one mass transfer promoter 22 is separates from the solvent 9. After separation, the at least one mass transfer promoter 22 is cycled back to the absorption unit 20 for reuse and the solvent 9', containing the salt to be crystallized, is sent to the crystallization unit 30.

After crystallization, the remaining concentrated solvent 19', containing the salt to be crystallized is cycled back to the crystallization unit 30 for reuse without further treatment and salt crystals 24 are recovered using vacuum filtration.

This embodiment is advantageous when the mass transfer promoter is an enzyme.

Figure 3:
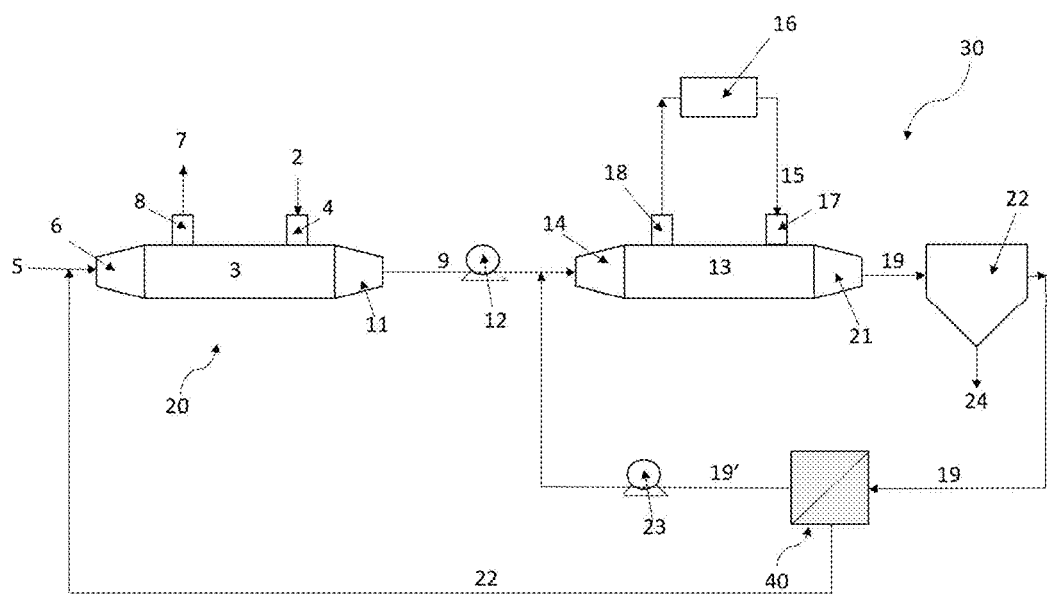
FIG. 3 is a flow diagram showing the steps of the continuous process according to yet another embodiment of the present invention.

FIG. 3 illustrates another particular embodiment of the implementation of the process of the present invention using the system 1, in which the pre-filtration unit 40 is fluidically coupled to the crystallization unit 30.

In this embodiment as illustrated in FIG. 3, the solvent 9, containing the salt to be crystallized and at least one mass transfer promoter, is sent to the crystallization unit 30. After crystallization, the remaining concentrated solvent 19, containing the salt to be crystallized and least one mass transfer promoter is sent to the filtration unit 40, where the at least one mass transfer promoter 22 is separated from the concentrated solvent 19. The at least one mass transfer promoter 22 is cycled back to the absorption unit for reuse and the concentrated solvent 19', containing the salt to be crystallized, is cycled back to the crystallization unit 30 for reuse and salt crystals 24 are recovered using vacuum filtration. In some embodiments, $Na_2CO_3$ may be added to the concentrated solvent 19. Said addition may increase the recovery of the amino acid used as mass transfer promoter 22.

This embodiment is advantageous when the mass transfer promoter is an amino acid, as the amino acid may help for the crystallization of sodium bicarbonate.

According to one embodiment, the system 1 further comprises a heater configured to heat the gas and/or liquid flux.

According to one embodiment, the system 1 further comprises a chiller configured to cool the extracting fluid.

According to one embodiment, if the extracting fluid is a vacuum, the system 1 further comprises a condenser configured to condensate the water that evaporates through the second membrane contactor.

According to one embodiment, the solvent 5 can be recycled at the end of the process and re-used.

According to one embodiment, the amount of solvent 5 can be adjusted within the process. Especially, further amounts of solvent can be added anytime needed.

While various embodiments have been described and illustrated, the detailed description is not to be construed as being limited hereto. Various modifications can be made to the embodiments by those skilled in the art without departing from the true spirit and scope of the disclosure as defined by the claims.

EXAMPLES

The present invention is further illustrated by the following examples.

Example 1: Production of Sodium Bicarbonate Crystals Using L-Arginine or Carbonic Anhydrase as Mass Transfer Promoter This example illustrates the production of sodium bicarbonate crystals from the carbon dioxide of a gas stream using L-arginine or carbonic anhydrase as mass transfer promoter.

Materials and Methods

Chemicals

The gas stream is composed of 85% vol air and 15% vol carbon dioxide of purity ≥99.7% vol.

The aqueous solution of sodium carbonate was made by diluting sodium carbonate in deionized water.

Bovine carbonic anhydrase or L-arginine were used as mass transfer promoter.

Material

The first and second membrane contactors used to carry out the experiments are the 3M™ Liqui-Cel™ MM-1×5.5 Series Membrane Contactor. The membrane characteristics are summarized in table 2:

TABLE 2

| Membrane characteristics | Data from manufacturer |
|---|---|
| Module configuration | Hollow fibers |
| Membrane material | Polypropylene |
| Potting material | Polyurethane |
| Fiber i.d./o.d. | 240/300 μm |
| Wall thickness | 40 μm |
| Effective pore size | 0.04 μm |
| Porosity | 40% |
| Effective membrane surface area | 0.18 m² |
| Effective fiber length | 0.18 m |
| Number of fibers | 2300 |
| Burst strength | 27 bar |
| Contact angle | 112° |

Methods

On the gas side, preferably the shell side, the gas stream enters the first membrane contactor, counter-currently to the aqueous solution of sodium carbonate.

On the liquid side, preferably the lumen side, the aqueous solution of sodium carbonate containing L-arginine or carbonic anhydrase flows through the first membrane contactor.

The $CO_2$ concentration at the outlet is measured by a $CO_2$ analyzer in parts per millions at each second of the experiments.

Solvent samples are taken at any time from the liquid valves in order to analyze the species in solutions (carbonates, bicarbonates, etc).

The aqueous solution of sodium carbonate captures the carbon dioxide from the gas stream, and exits the first membrane contactor towards the second membrane contactor.

The $CO_2$-containing solution enters the second membrane contactor, concentrates and circulates toward the crystallization tank where the crystallization takes place. There, the concentrated solution is mixed by a mixer (Heidolph RZR 2051 control, Germany) and kept at constant temperature via a temperature regulator (Julabo Corio CD-BC4, Germany).

Three set up were used on the permeate side:

Set up I: the permeate tank is filled with deionized water cooled by a chiller at a temperature. The deionized water circulates through the permeate side of the membrane via a gear pump (Cole-Parmer 7511-70, USA) and cycle back to the permeate tank.

Set up II: the permeate side is kept under vacuum thanks to a vacuum pump (Vacuubrand MD4CNT, Germany) and the water that evaporates through the membrane is condensed in a condenser (glass condenser and Julabo Corio CD-900F, Germany). A controller (Vacuu-select, Vacuubrand, Germany) monitors the vacuum level.

Set up III: the permeate tank is filled with an osmotic solution (i.e., solution containing high concentration of salts). The osmotic solution circulates through the permeate side of the membrane via a gear pump (Cole-Parmer 7511-70, USA) and cycles back to the permeate tank.

The salts comprised in the osmotic solution may for instance comprise or consist of NaCl. The NaCl concentration preferably ranges between 200 and 300 mg/L, in particular it is about 300 mg/L.

In set up I, II and III, the weight of the permeate tank is monitored by a balance (LP 4202 I, VWR, Italy), and temperature is recorded with a temperature data logger (Testo 176 T2, Belgium) connected to PT100 temperature probes (Fabritius, Belgium).

Once the crystals appear in the crystallization tank, the process is stopped, and the solution is filtered using vacuum filtration (Whatman 1442 125 filters). The sodium bicarbonate crystals are then kept in a desiccator in order to dry them gently before characterization.

The experimental conditions used for the experiments are summarized in Table 3:

TABLE 3

| Parameters | Value |
|---|---|
| Gas flow rate | 100 ml/min (0.005127 m/s) |
| Aqueous solution flow rate | 400 ml/min (0.07625 m/s) |
| CO2 concentration | 0.15 ppmv |
| Na2CO3 concentration | 0.5 mol/l |
| L-arginine concentration | 0.5 mol/l |
| CA concentration | 100 mg/l |
| Temperature (absorption unit) | 22° C. |
| Inlet temperature (crystallization unit) | 22° C. (osmotic); 25 to 40° C. (direct/vacuum) |
| Permeate inlet temperature | 22° C. (osmotic); 5 to 25° C. (direct/vacuum) |
| deionized water flow rate | 100 to 400 mL/min |
| Vacuum level | 10 to 40 mbar (30 mbar) |

The CA concentration ranged between 0.1 and 100 mg/L.

Crystals Characterization

Crystal Morphology

Crystal morphology is studied using Scanning Electron Microscopy (SEM).

Crystal Size Distribution

Crystal size distribution is quantified using the wet granulometry method (Particle Counter).

Crystal Yield

The crystal yield is quantified by weighting the crystals after filtration and drying for $NaHCO_3$.

Results

The maximal mass transfer coefficient has been calculated for the absorption step with L-arginine or carbonic anhydrase (CA) as mass transfer promoter and for the crystallization step for the three set up. The results are reported in Table 4.

The purity of bicarbonates crystals was determined for all experiments.

TABLE 4

|  |  | Max $K_{ov}$ |
|---|---|---|
| Absorption | L-arginine | 0.012 m/s |
|  | CA | $5.8 \times 10^{-5}$ m/s |
| Crystallization | set up I | $6.8 \times 10^{-11}$ m/Pa/s |
|  | set up II | $6.5 \times 10^{-11}$ m/Pa/s |
|  | set up III | $9.5 \times 10^{-11}$ m/Pa/s |

A purity of more than 99% was obtained for the bicarbonate crystals with set up III. A purity of 95% was obtained for the bicarbonate crystals with set up II, and a high purity was also obtained for the bicarbonate crystals with set up I.

CONCLUSION

The process according to the invention afforded the production of sodium bicarbonate crystals from the carbon dioxide of a gas stream using L-arginine or carbonic anhydrase as mass transfer promoter. The sodium bicarbonate crystals obtained by the process of the invention present a high purity which can reach more than 99%.

The invention claimed is:

1. A continuous process for the production of sodium bicarbonate crystals, comprising:
   1) an absorption step of the gaseous carbon dioxide from a gas stream into an aqueous solution comprising a sodium carbonate salt, comprising the steps of:
      1a) contacting said gas stream with a first surface of a first porous membrane contactor; and contacting said aqueous solution of sodium carbonate with a second opposite surface of the same first porous membrane contactor, said gaseous carbon dioxide diffusing through the pores of the membrane into said aqueous solution of sodium carbonate where it dissolves; and
      1b) reacting the dissolved carbon dioxide with the sodium carbonate salt in the aqueous solution to produce an aqueous solution of sodium bicarbonate;
      said absorption step being performed in the presence of at least one mass transfer promoter selected from an amino acid or an enzyme;
      said at least one mass transfer promoter being in suspension in the aqueous solution of sodium carbonate or immobilized on said first porous membrane contactor; then
   2) a crystallization step of sodium bicarbonate salt, comprising the steps of:
      2a) circulating the aqueous solution containing the sodium bicarbonate at one side of a second porous membrane contactor;
      2b) applying a driving force by circulating an extracting fluid at the opposite side of the second porous membrane contactor, so that the water of the aqueous solution evaporates and diffuses through the pores of the second porous membrane contactor towards the extracting fluid at the opposite side of the second porous membrane contactor, where it re-condensates, leading to the progressive concentration of the aqueous solution of sodium bicarbonate,
      2c) sending the concentrated aqueous solution of sodium bicarbonate to a crystallization tank at the outlet of the second porous membrane contactor where crystal growth takes place; and
      2d) recovering the sodium bicarbonate crystals,
   wherein said first porous membrane contactor and second porous membrane contactor are in series.

2. The continuous process according to claim 1, wherein the at least one mass transfer promoter is an amino acid selected from L-arginine, 6-aminohexionine, L-valine, L-methionine and L-serine.

3. The continuous process according to claim 1, wherein the at least one mass transfer promoter is carbonic anhydrase.

4. The continuous process according to claim 1, wherein the concentration of the mass transfer promoter is between 0.1 mg/L and 1 mg/L.

5. The continuous process according to claim 1, wherein the concentration of the mass transfer promoter is between 0.1 mg/L and 0.5 mg/L.

6. The continuous process according to claim 1, further comprising a step of pre-filtrating said mass transfer promoter in suspension in the solvent through a filtering membrane.

7. The continuous process according to claim 1, wherein the gas stream is a flue gas from fossil fuel combustion, a flue gas from biofuel combustion, a gas from natural source or a combination thereof.

8. The continuous process according to claim 1, wherein the concentration of the gaseous carbon dioxide in the gas stream is between 5 vol % and 40 vol %.

9. The continuous process according to claim 1, wherein the concentration of the gaseous carbon dioxide in the gas stream is between 5 vol % and 20 vol %.

10. The continuous process according to claim 1, wherein the concentration of the sodium carbonate salt in the aqueous solution comprising a sodium carbonate salt is between 0.1 mol/L and 2.0 mol/L.

11. The continuous process according to claim 1, wherein the concentration of the sodium carbonate salt in the aqueous solution comprising a sodium carbonate salt is between 0.1 mol/L and 1.0 mol/L.

12. The continuous process according to claim 1, wherein the Reynolds number for the gas stream is between about 2 and about 15.

13. The continuous process according to claim 1, wherein the Reynolds number for the gas stream is between about 2 and about 10.

14. The continuous process according to claim 1, wherein the Reynolds number for the gas stream is between about 5 and about 10.

15. The continuous process according to claim 1, wherein the Reynolds number for the aqueous solution comprising a sodium carbonate salt is between about 2 and about 30.

16. The continuous process according to claim 1, wherein the Reynolds number for the aqueous solution comprising a sodium carbonate salt is between about 2 and about 25.

17. The continuous process according to claim 1, wherein the Reynolds number for the aqueous solution comprising a sodium carbonate salt is between about 10 and about 25.

18. The continuous process according to claim 1, wherein the extracting fluid is selected from a liquid, a mixture of liquids, a concentrated aqueous solution of one or more salts, a gas, a gas mixture or vacuum.

19. A system for the production of sodium bicarbonate crystals from carbon dioxide of a gas stream, comprising:
   a control unit configured to control the gas and/or liquid flow rate, and the gas and/or liquid temperatures;
   an absorption unit comprising a first porous membrane contactor configured to allow contact between a gas stream containing gaseous carbon dioxide and a solvent which is an aqueous solution of sodium carbonate; and
   a gear pump,
   wherein the gas stream and the solvent are separated by said first porous membrane contactor, and wherein said first porous membrane contactor contains means for diffusing the gaseous carbon dioxide of the gas stream towards the solvent, where it dissolved and react with the sodium carbonate to produce sodium bicarbonate, said means being pores; and
   a crystallization unit comprising a second porous membrane contactor configured to allow contact between the aqueous solution containing the sodium bicarbonate to be crystallized coming from the absorption unit and an extracting fluid; a permeate tank containing the extracting fluid; and a crystallization tank where the crystallization takes place,
   wherein the second membrane contactor is fluidically coupled to the crystallization tank and to the permeate tank,
   wherein the water of the aqueous solution containing the sodium bicarbonate to be crystallized coming from the absorption unit circulates at one side of the second porous membrane contactor toward the crystallization tank and the extracting fluid coming from the permeate tank circulates at the opposite side of the second porous membrane contactor, and wherein said second porous membrane contactor contains means for the selective transport of the water of the aqueous solution towards the opposite side, said means being pores, wherein said absorption unit and crystallization unit are fluidically coupled.

20. The system according to claim 19, further comprising a pre-filtration unit, fluidically coupled to the absorption unit and/or the crystallization unit.

* * * * *